United States Patent [19]

Heller

[11] 3,891,301

[45] June 24, 1975

[54] ADJUSTABLE SUPPORT OR STAND FOR AN OPTICAL OBSERVATION INSTRUMENT

[75] Inventor: Rudolf Heller, Zurich, Switzerland

[73] Assignee: Contraves AG, Zurich, Switzerland

[22] Filed: Sept. 9, 1974

[21] Appl. No.: 504,539

Related U.S. Application Data

[63] Continuation of Ser. No. 379,194, July 13, 1973, abandoned.

[30] Foreign Application Priority Data

Aug. 18, 1972 Switzerland.................... 12251/72

[52] U.S. Cl. .............................. 350/85; 354/81
[51] Int. Cl. ........................................ G02b 23/16
[58] Field of Search .................. 350/82-85; 354/81

[56] References Cited
UNITED STATES PATENTS

| 2,651,560 | 9/1953 | Gerber | 350/85 X |
| 3,475,075 | 10/1969 | Stone | 350/85 |
| 3,762,796 | 10/1973 | Heller | 350/85 |

FOREIGN PATENTS OR APPLICATIONS

| 1,901,180 | 11/1969 | Germany | 350/85 |

*Primary Examiner*—David H. Rubin
*Attorney, Agent, or Firm*—Werner W. Kleeman

[57] ABSTRACT

An adjustable support for an optical observation instrument, especially a binocular microscope, the position and/or orientation of which can be freely adjusted and fixed within a spatial area, comprising an elongated balance beam supported at its fulcrum on a stationary support by means of two blockable bearings having respective vertical and horizontal converging axes, one arm of the balance beam being equipped with an adjustable compensation weight, an elongated intermediate member supported at its fulcrum on the other arm of the balance beam by means of two blockable bearings having respective axes converging and perpendicular to each other, one axis being horizontal and the other being oriented substantially lengthwise to the intermediate member, one arm of the intermediate member being equipped with an adjustable weight while the instrument carrier is supported on the other arm of the intermediate member by means of an articulated rod arrangement. The blockable bearings may be actuated from a switch means affixed to a handgrip. The articulated rod arrangement may be a parallel motion rod arrangement having at least one blockable bearing and to which the observation instrument is affixed by means of an instrument carrier and a further blockable bearing, the axis of which lies in the parallel motion plane.

4 Claims, 1 Drawing Figure

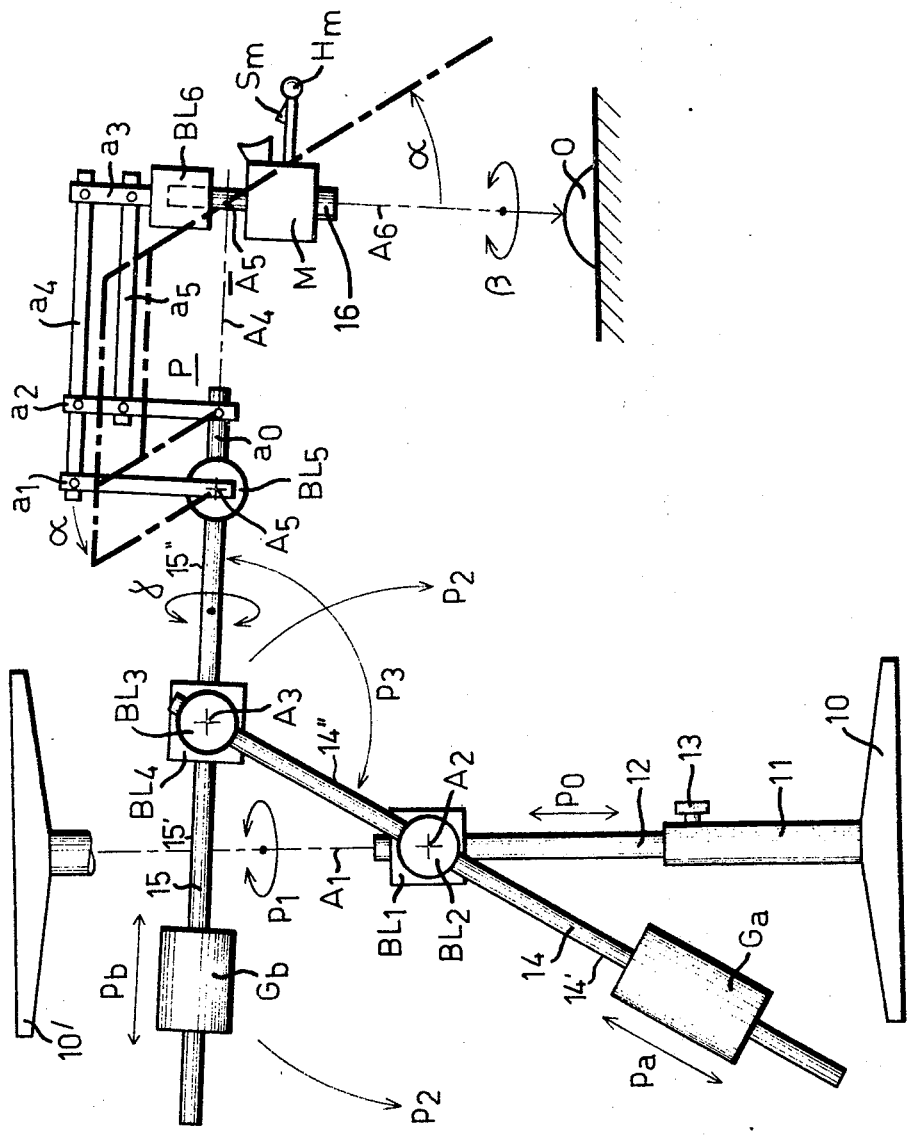

ADJUSTABLE SUPPORT OR STAND FOR AN OPTICAL OBSERVATION INSTRUMENT

CROSS-REFERENCE TO RELATED CASE

This is a continuation application of my commonly assigned copending case Ser. No. 379,194, filed July 13, 1973, now abandoned.

BACKGROUND OF THE INVENTION

The present invention relates to a new and improved construction of adjustable support or stand for an optical observation instrument, especially a binocular microscope.

The support or stand of this invention can be, for instance, used in conjunction with a telescope, binoculars, a camera, also for instance a TV-camera. However, according to a preferred environment of use, the invention is directed to a support or stand for a binocular microscope, as such can be employed for manufacturing or assembling precision mechanical, optical or electrical components, but also for carrying out surgical operations, especially brain surgery. During such use of observation instruments, the requirement exists of providing a support or stand, by means of which the observation instrument or device can be quickly and sufficiently selectively accurately oriented and appropriately brought into visual alignment with each localized zone or region of a larger area. Upon reaching the desired position and/or orientation the observation device must be able to be fixed in such selected position. It should be recognized that especially when performing brain surgery, the surgeon is particularly dependent upon an observation device embodying a binocular microscope which can be adjusted at a location which is not disturbing to him into a position for viewing the operation zone. He then uses such binocular microscope for the microscopic observation of certain regions of the operating zone. Furthermore, the surgeon should be able to quickly and positively adjust the binocular microscope into the desired effective position so as to be an aid to him in carrying out incisions and surgical manipulations.

In my copending, commonly assigned U.S. patent application, Ser. No. 188,933, filed Oct. 13, 1971, now U.S. Pat. No. 3,762,796, and entitled "Adjustable Support or Stand for an Optical Observation Instrument" there is disclosed an adjustable support or stand for an optical observation instrument, especially a binocular microscope, the position and/or orientation of which can be freely adjustable and fixed within a spatial region and wherein there is provided a first rod assembly which can carry out its freely combined rotation about three axial directions oriented transversely with respect to each other from a handgrip, and the observation instrument is secured via the first rod assembly with a spatially freely adjustable end piece of a second rod assembly which is mounted at a fixed support. With this type of prior art construction, any change affecting the weight and/or the location of the center of gravity of the whole system, for instance any minor change in auxiliary instruments such as the fixing, removing or rearranging of a film- or TV-camera, has to be balanced out by changing the mass and/or the location of a sole balancing weight. The balance has to be attained as a whole, i.e. it cannot be obtained by stepwise compensating the gravitational moments with respect to successively all rotation axes, one at a time; therefore balancing has to be made by a skilled operator. Furthermore, the arrangement of Cardan-partial frames disclosed and taught in this prior art construction constitutes a spatial hindrance to the instruments used in conjunction with the support, resulting in a limitation of the movements and adjustments which are possible.

In other prior art constructions there is shown an adjustable support with an optical system and means to adjust the latter to a desired position. Such art is taught for instance in U.S. Pat. No. 3,475,075 or in the German Patent Publication No. 1,901,180, both showing separate actuating motors provided for the independent movements which can be carried out by the user with respect to positionally orienting the observation instrument. It turns out that such positioning by independent movements requires extreme coordination and concentration on the part of the user of the instrument, and considering the fact that such might be employed by surgeons to carry out delicate operations the same would obviously detract from his attention at the operating site.

SUMMARY OF THE INVENTION

It is a primary object of the present invention to provide an improvement upon the adjustable stand or support disclosed in my aforementioned United States patent application, now U.S. Pat. No. 3,762,796.

Another and more specific object of the present invention relates to an improved construction of adjustable stand for an optical observation instrument, especially a binocular microscope, capable of providing a desired compensation of the rotational moments caused by gravity by means which are easier to adjust, and a less narrowly limited adjustment range even when there are selectively mounted different auxiliary devices, for instance a film or TV-camera, at the observation instrument.

Now according to the invention and for the purpose of implementing the aforementioned objects and others which will become more readily apparent as the description proceeds, the improved constructional embodiment is constituted by an adjustable stand for an optical observation instrument, the position and/or orientation of which can be freely adjusted and fixed in a spatial area, the instrument being affixed to an instrument carrier articulately supported on an intermediate member which in turn is spatially adjustable with respect to a stationary support, and is manifested by the features that an elongated balance beam having a fulcrum defining two arms is supported at its fulcrum on the stationary support by means of two first blockable bearings having respective vertical and horizontal converging axial directions, one arm of the balance beam is equipped with a first adjustable compensation weight and the other arm is connected to an elongated intermediate member having a fulcrum defining two arms, the connection being made at the latter fulcrum by means of two second blockable bearings having respective axial directions converging and oriented transversely to each other, one axial direction being horizontal and the other being oriented substantially lengthwise to the intermediate member, and one arm of the intermediate member is equipped with a second adjustable compensation weight while the instrument carrier is articulatively supported on the other arm of the intermediate member.

There is preferably additionally contemplated, according to the invention, that the instrument carrier is connected by means of a third blockable bearing with a terminal piece of a rod included in a parallel motion rod arrangement defining a motion plane and which arrangement is articulatively supported on the intermediate member. The axis of the third bearing substantially lies in the motion plane of the rod arrangement, the rod arrangement is equipped for parallel motion with fourth bearings having respective axes parallel to each other and perpendicular to the motion plane and of which at least one is blockable, and the rod arrangement comprises at least two elongated members substantially oriented lengthwise parallel to the intermediate member. Furthermore, it is contemplated that upon actuation of a switch means provided at a handgrip all blockable bearings are electromagnetically deblocked and upon reverse actuation all blockable bearings are blocked, whereby upon actuation of the switch means the instrument carrier with an optical observation instrument affixed thereto is freely adjusted to a desired direction and upon reverse actuation of the switch means the carrier and instrument are blocked in the attained adjusted position.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE thereof schematically illustrates a preferred exemplary embodiment of adjustable stand or support for an observation instrument designed according to the teachings of the present invention.

DETAILED DESCRIPTION OF THE PREFERRED EMBODIMENTS

Describing now the drawing, it is to be understood that reference characters $BL_1$, $BL_2$, $BL_3$, $BL_4$, $BL_5$ and $BL_6$ designate single-axis braking bearing means in which there are mounted electro-magnetic blockable and deblockable braking disks, and such braking bearing means may be of the type disclosed in U.S. Pat. Nos. 2,651,560 and 3,762,796 and which are known to the art. Upon actuation of the switch $S_m$ arranged at an adjustment handgrip $H_m$ of the instrument carrier 16 whereto is affixed for example the binocular microscope M, such blockable braking bearing means $BL_1$, $BL_2$, $BL_3$, $BL_4$, $BL_5$ and $BL_6$ permit free rotational movement of the operatively associated components of the stand or support about their associated axis of rotation $A_1$, $A_2$, $A_3$, $A_4$, $A_5$, and $A_6$ and upon non-actuation of such switch $S_m$ all of these rotational movements are again blocked.

Reference numerals 10 and 10' designate a respective socket or stationary support which can be secured, as the case may be, to the floor or the ceiling of a room, and such socket has mounted thereat a hollow guide tube or column 11 having a substantially vertical axis. After releasing the adjustment or fixing screw 13 or equivalent expedient it is possible to telescopically adjust, in the direction of the double-headed arrow $p_0$, a support rod 12 within the hollow guide tube or column 11. At the free end of this support rod 12 there is mounted the brake bearing means $BL_1$ and upon actuation of the switch $S_m$ such can be selectively rotated about the vertical axis $A_1$ in the direction of the double-headed arrow $p_1$. The brake bearing means $BL_2$ which is mounted laterally of and at the brake bearing means $BL_1$, serves as a fulcrum and support for a balance beam 14 and permits the selective rocking or pivotal movement thereof in the direction of the arrows $p_2$ about the horizontal axis $A_2$ which is oriented transversely with respect to the axis $A_1$.

Now at one arm 14' of the balance beam 14 there is adjustably mounted a first compensation or balance weight $G_a$ for movement in the direction of the arrow $p_a$. The other arm 14'' of the balance beam 14 is connected at its end through the horizontal axis $A_3$ at the brake bearing means $BL_3$, and which horizontal axis is located in parallelism with the axis $A_2$, with the brake bearing means $BL_4$. At this brake bearing means $BL_4$ there is rotatably mounted an elongated intermediate member 15 forming a second balance beam for movement about its lengthwise axis $A_4$ for changing the adjustment angle $\gamma$. On the other hand, the balance beam 15 is pivotable in the direction of the double-headed arrow $p_3$ about the axis $A_3$ of the brake bearing means $BL_3$ defining a fulcrum for the balance beam 15. Here also there is adjustably mounted at the terminal portion of one arm 15' of the balance beam 15 a second compensation or balance weight $G_b$ which can be axially slidably shifted in the direction of the double-headed arrow $p_b$. The balance beams 14, 15 can be conveniently considered to constitute a pivot rod assembly.

With the other arm 15'' of the balance beam 15 there is connected the brake bearing means $BL_5$. The rod $a_1$ of a parallel motion rod arrangement P having the further rods $a_2$, $a_3$, $a_4$, $a_5$ and $a_0$ is mounted to be pivotable about the axis $A_5$ of the brake bearing means $BL_5$, which axis is oriented transversely with respect to the balance beam axis $A_4$, in order to be able to change the angle $\alpha$. The rod $a_0$ is fixedly arranged as a longitudinal extension of the balance beam 15, i.e., in the direction of the axis $A_4$. The rod components or rods $a_1$, $a_2$ and $a_3$ are always automatically parallel with respect to each other and the rods $a_4$ and $a_5$ always remain parallel to the axis $A_4$. The plane defined by and containing the parallel motion rod arrangement P can be rotated together with the balance beam 15 about its lengthwise axis $A_4$ at the brake bearing means $BL_4$, in order to be able to appropriately alter the angle $\gamma$. In the axial extension of a terminal piece of the rod $a_3$ of the parallel motion rod arrangement P there is secured the brake bearing means $BL_6$, and an instrument carrier 16 is rotatable about an axis $A_6$ of such brake bearing means $BL_6$ for the purpose of randomly altering the angle $\beta$ of a binocular microscope M affixed to it.

Due to the momentary position of the brake bearing means $BL_5$ there is determined the momentary location of the point of intersection of the axes $A_4$ and $A_6$, and there also passes through this point of intersection a virtual pivot axis $\overline{A}_5$ which is parallel to the axis $A_5$ of the brake bearing means $BL_5$ at a spacing forwardly thereof corresponding to the length of the rod $a_4$.

As should be apparent, it is thus possible to freely adjust the orientation of the microscope M from the axes intersection point $A_4$, $A_6$, $\overline{A}_5$ in the three independent angles $\gamma$, $\alpha$, $\beta$. On the other hand, by pivotably moving the balance beam 14 about the vertical axis $A_1$ and the horizontal axis $A_2$, and the balance beam 15 about the horizontal connection axis $A_3$ with the balance beam 14, it is possible to freely adjust the situs of the brake bearing $BL_5$ within an extended conical contour zone or region.

It is therefore possible to mutually compensate with respect to the axis $A_4$ the rotational moments brought about by gravity of all components rotatable with the parallel motion rod arrangement P about the axis $A_4$ and that the common center of gravity of such components is disposed as closely as possible to the intersection point of the axes $A_4$, $A_6$ and $\overline{A}_5$.

By appropriately dimensioning the compensation of balance weight $G_b$ at the balance beam 15 and by appropriately selectively displacing the same in the direction of the double-headed arrow $p_b$, it is possible to achieve the result that all gravity-related rotational moments of the components of the stand or support which are supported directly or indirectly at the brake bearing means $BL_3$, including the microscope M and possibly auxiliary devices mounted thereat, for instance a film camera or TV-camera, are compensated with regard to the axis $A_3$. Furthermore, by appropriate dimensioning of the compensation or balance weight $G_a$ at the balance beam 14 and by appropriate selective displacement thereof in the direction of the double-headed arrow $p_a$ it is possible to achieve the result that the gravity-dependent rotational moments of all components of the stand and the devices mounted thereon can be mutually compensated with regard to the axis $A_2$.

Hence the compensating of the gravity-dependent rotational moments proceeds stepwise with respect to successively all rotation axes, one at a time. It is easily done and does not require a particularly skilled operator.

Even with the use of slight force, following actuation of the switch $S_m$ at the adjustment handgrip $H_m$, it is possible to manually directly adjust, according to the requirements of the user and his judgment, each location and each orientation of the binocular microscope M with regard to observation of an object O, and after releasing the switch $S_m$ the microscope M is effectively blocked in the adjusted location and in the adjusted orientation.

While there is shown and described present preferred embodiments of the invention, it is to be distinctly understood that the invention is not limited thereto, but may be otherwise variously embodied and practiced within the scope of the following claims. Accordingly,

What is claimed is:

1. Adjustable stand for an optical observation instrument, the position and orientation of which can be freely adjusted and fixed in a spatial area, comprising an observation instrument, an instrument carrier for having the observation instrument affixed thereto, a stationary support, an elongated balance beam having a fulcrum defining two arms and supported at its fulcrum on the stationary support by means of two first blockable bearings having respective vertical and horizontal converging axial directions, one arm of the balance beam being equipped with a first adjustable compensation weight, an elongated intermediate member having a fulcrum defining two arms and supported at its fulcrum on the other arm of the balance beam by means of two second blockable bearings having respective axial directions converging and oriented transversely to each other, one axial direction being horizontal and the other being oriented substantially lengthwise to the intermediate member, one arm of the intermediate member being equipped with a second adjustable compensation weight while the instrument carrier is supported on the other arm of the intermediate member by means of an articulated rod arrangement.

2. The adjustable stand as defined in claim 1, wherein the articulated rod arrangement is a parallel motion rod arrangement defining a motion plane and comprising a rod having a terminal piece whereon the instrument carrier is supported by means of a third blockable bearing, the axial direction of which is substantially lying in the motion plane of the rod arrangement, wherein further the rod arrangement is articulatively supported on the intermediate member and is equipped for parallel motion with fourth bearings having respective axes parallel to each other and perpendicular to the motion plane and of which at least one is blockable, the rod arrangement comprising at least two elongated members substantially oriented lengthwise parallel to each other and to the intermediate member.

3. The adjustable stand as defined in claim 1, further comprising a handgrip having switch means for actuating the first and second blockable bearings.

4. The adjustable stand as defined in claim 2, further comprising a handgrip having switch means for actuating the first, second, third and fourth blockable bearings.

* * * * *